(No Model.)
W. J. DUNLAP.
THRASHING MACHINE SEPARATOR.
No. 271,046. Patented Jan. 23, 1883.
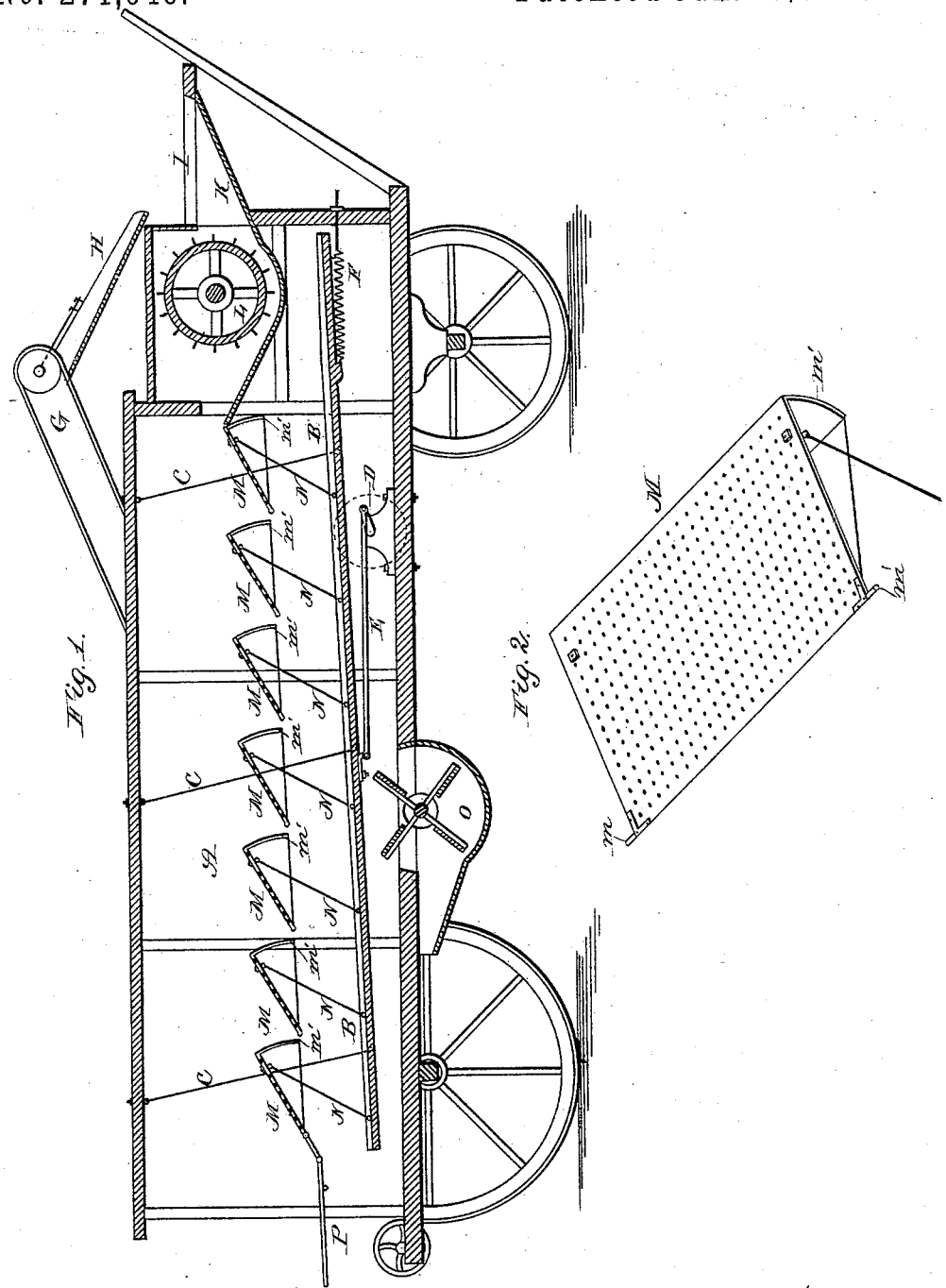
Witnesses:
J. W. Garner
W. J. Osgood
Inventor:
William J. Dunlap
per H. A. Snow
Atty.
N. PETERS. Photo-Lithographer, Washington, D. C.

UNITED STATES PATENT OFFICE.

WILLIAM J. DUNLAP, OF FLUSHING, OHIO.

THRASHING-MACHINE SEPARATOR.

SPECIFICATION forming part of Letters Patent No. 271,046, dated January 23, 1883.

Application filed October 20, 1882. (No model.)

*To all whom it may concern:*

Be it known that I, WILLIAM J. DUNLAP, a citizen of the United States, residing at Flushing, in the county of Belmont and State of Ohio, have invented certain new and useful Improvements in Thrashing-Machine Separators, of which the following is a specification, reference being had therein to the accompanying drawings.

My invention relates to an improvement in grain-separators; and it consists in the construction and arrangement of its several parts, as will be hereinafter fully set forth, and pointed out in the claims.

In the accompanying drawings, Figure 1 is a vertical longitudinal section of my invention. Fig. 2 is a detailed perspective of one of the agitators.

A represents a frame or box of any suitable construction, in which is suspended an apron, B, by means of the rods C, the said rods being pivoted at their ends, so as to allow the apron to oscillate. The apron is inclined sufficiently to discharge the grain that falls upon it at the lower end. Motion is imparted to the apron by means of a crank, D, and connecting-rod E or by means of any preferred mechanism. To the front end of the apron is attached a suitable retractile spring, F, its function being to cause the forward movement of the apron to be more violent than the rearward one, for a purpose to be explained hereinafter.

G is a return-elevator to carry the tailings back to the slide H, whence they pass through the openings I upon the concave K, furnished with the two extensions—the receiving and the discharge, respectively—to the thrashing-cylinder L.

M represents a series of agitators, pivoted at their lower edges to the sides of the frame by means of the trunnions $m$. The faces of the agitators are perforated to admit of the passage of grain through them, and their front upper edges are bent and curved down, as at $m'$, forming guards to prevent the straws from being caught. Motion is imparted to the agitators by means of the rods N, which are pivoted to them and to the oscillating apron, as shown. The series of agitators is inclined, as shown, and as the straw passes along them the violent forward movement of the apron, occasioned by the spring F, causes them to strike against the straw forcibly and dislodge the grain, which falls upon the apron and discharges at the rear end thereof, and is winnowed by means of a blast from the fan O. The straw is discharged from the last of the series of agitators by the fingers P, pivoted to it, as shown.

Having thus described my invention, what I claim is—

1. The series of inclined pivoted agitators, in combination with a suitable cylinder and concave, an oscillating or reciprocating apron connected thereto, pivoted discharge-fingers connected to the last of the series of agitators, and a blast-fan for winnowing the grain as it falls from the apron, substantially as set forth.

2. The combination of the series of inclined pivoted perforated agitators M, having the guards $m'$ and the pivoted connecting-rods N, with the inclined pivotally-suspended apron B, mechanism for operating the same, retractile spring F, connected thereto, suitable cylinder and concave, L and K, pivoted straw-discharging fingers P, connected to the last of the series of agitators, and a suitable blast-fan, O, for winnowing the grain as it falls from the apron, as set forth.

In testimony whereof I affix my signature in presence of two witnesses.

WILLIAM J. DUNLAP.

Witnesses:
JACOB A. HOLLOWAY,
JNO. M. KIRK.